United States Patent [19]

Aihara et al.

[11] 4,329,030
[45] May 11, 1982

[54] INTEGRATING TIME DETECTOR FOR PHOTOGRAPHIC APPARATUS

[75] Inventors: Mamoru Aihara; Yutaka Takahashi; Yoshio Nakajima, all of Hachioji; Tsuyoshi Matsuura, Ina, all of Japan

[73] Assignee: Olympus Optical Company, Ltd., Japan

[21] Appl. No.: 193,839

[22] Filed: Oct. 3, 1980

[30] Foreign Application Priority Data

Oct. 5, 1979 [JP] Japan .................................. 54-128009

[51] Int. Cl.³ .............................................. G03B 7/093
[52] U.S. Cl. ...................................... 354/23 D; 354/51
[58] Field of Search .................................. 354/23 D, 51

[56] References Cited

U.S. PATENT DOCUMENTS 4,176,929 12/1979 Ito et al. .................................. 354/29

FOREIGN PATENT DOCUMENTS

| 2624866 | 12/1977 | Fed. Rep. of Germany . |
| 2843941 | 4/1979 | Fed. Rep. of Germany . |
| 52-147776 | 12/1977 | Japan . |
| 53-3261 | 2/1978 | Japan . |
| 54-566835 | 5/1979 | Japan . |
| 54-161326 | 12/1979 | Japan . |

Primary Examiner—Michael L. Gellner
Attorney, Agent, or Firm—Weinstein & Sutton

[57] ABSTRACT

An integrating time detector derives an integrating time interval within a reduced period of time, by decreasing a reference voltage against which an integrated voltage is compared in accordance with a time function stored in a computer.

14 Claims, 6 Drawing Figures

INTEGRATING TIME DETECTOR FOR PHOTOGRAPHIC APPARATUS

BACKGROUND OF THE INVENTION

The invention relates to an integrating time detector for use in a photographic apparatus.

An integrating circuit is used, for example, in a photometric circuit of a photographic apparatus, in particular, in a direct photometric circuit. The integrating circuit is adapted to integrate a photocurrent which is produced by a photoelectric transducer element in response to the incidence of reflected light from an object being photographed thereon in order to determine an exposure period which corresponds to the light from the object. Such circuit suffers from the disadvantage that the integration cannot be performed over an increased length of time since the integrating period is limited by the characteristic of an integrating capacitor used, for example, the leakage current thereof. When the integrating circuit is used in a photographic camera, this means that the combination cannot allow an exposure period for the camera which has an increased value. On the other hand, when such integrating circuit is used in a situation involving a low level of illuminance as when taking a picture with a microscope, an inconvenience is experienced that it takes a long integrating time.

SUMMARY OF THE INVENTION

It is an object of the invention to eliminate the described disadvantages of the prior art by providing an integrating time detector for a photographic apparatus which is capable of calculating a required integrating time interval at an earlier time, even for an increased length of integrating time, by changing a reference voltage against which an integrated voltage is compared to determine the integrating time interval.

In accordance with the invention, a reference voltage against which an integrated voltage is compared is changed to permit the calculation of a required integrating time interval at an earlier time, if the latter has an increased duration, before the actual integrating time interval lapses. In this manner, the adverse influence of the leakage current from an integrating capacitor is eliminated even when an integrating time interval of an increased length is involved. When taking a picture with a microscope where the illuminance is of a low level to necessitate an increased length of integrating time, the required integrating time interval can be calculated at an earlier time.

DESCRIPTION OF PREFERRED EMBODIMENT

Figure 1:
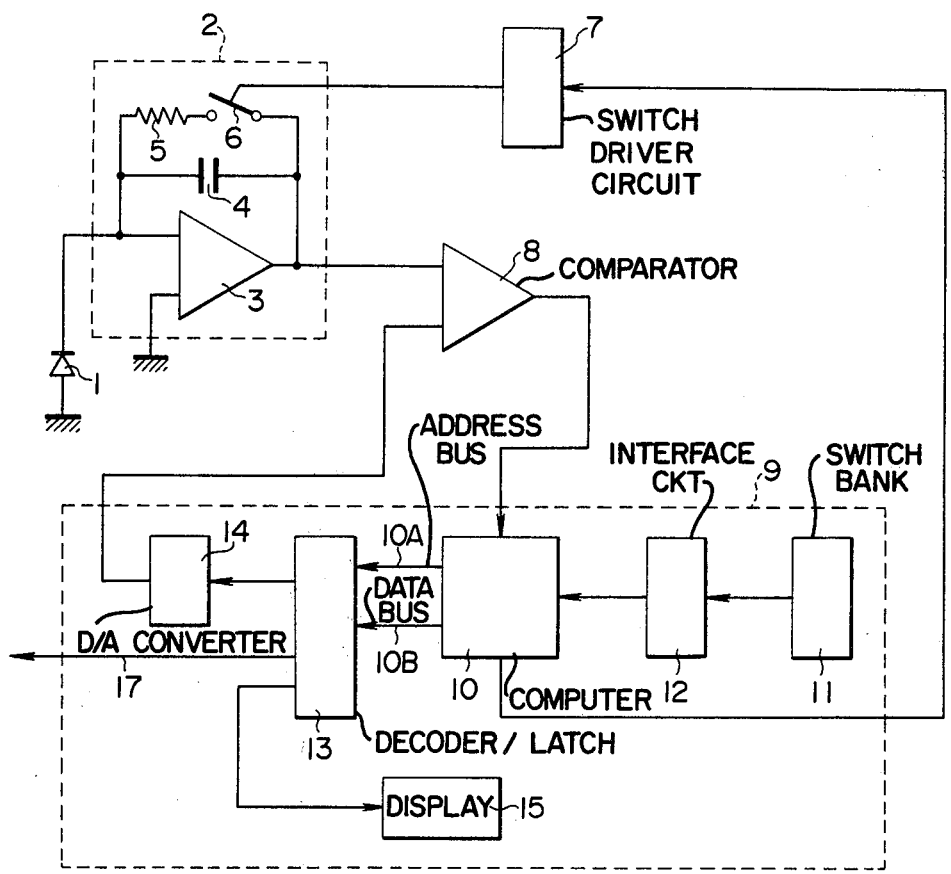
FIG. 1 is a block diagram of the electrical circuit of the integrating time detector according to one embodiment of the invention.

Referring to FIG. 1, there is shown the electrical circuit of an integrating time detector according to the invention. Specifically, it includes a photoelectric transducer element 1 which is responsive to light from an object being photographed to produce an output photocurrent, which is in turn integrated by an integrating circuit 2. An output from the integrating circuit 2 or an integrated voltage is fed to a voltage comparator 8, which is also fed with a reference voltage from a calculation and control circuit 9. The integrating circuit 2 is associated with a switch driver 7 which controls the discharge of the integrated voltage.

More specifically, the integrating circuit 2 includes an operational amplifier 3 having an input which is fed with the output photocurrent from the transducer element 1, with an integrating capacitor 4 connected across the input and the output terminal thereof and with a series combination of a discharge resistor 5 and a switch 6 connected in shunt with the capacitor. The purpose of the series combination of the resistor 5 and the switch 6 is to clear or discharge the integrated voltage across the capacitor whenever the detector has determined the integrating time interval.

The calculation and control circuit 9 comprises a bank of switches 11 which are utilized to preset a film speed, an interface circuit 12 which responds to the film speed information supplied from the bank 11 by converting it into a voltage level which is compatible with a subsequent computer 10, a decoder/latch 13 which receives and latches various control information from the computer 10 through an address bus 10A and a data bus 10B and which decodes such information, a digital-analog converter 14 which is supplied with digital information representing a reference voltage from the decoder/latch 13 and converts it into an analog reference voltage, and a display 15 for displaying information indicative of the integrating time interval which is supplied from the decoder/latch 13. The analog reference voltage which is produced by the D-A converter 14 is applied to one input of the voltage comparator 8 where it is compared against the integrated voltage from the circuit 2 which is applied to the other input thereof. When the integrated voltage is equal to or exceeds the analog reference voltage, the comparator produces an output signal, which is fed to the computer 10. It will be understood that on the basis of film speed information supplied from the bank of switches 11, the computer 10 develops a reference voltage, which is supplied to the comparator 8 through the A-D converter 14, and monitors the comparison result to determine the integrating time interval. When the integrating time interval is determined, the computer 10 delivers an integration complete signal which is fed to the switch driver 7, causing the latter to close the switch 6 in the integrating circuit 2 to thereby discharge the integrated voltage across the capacitor 4 through the discharge resistor 5. This completes an integrating operation, and the circuit is ready to initiate another cycle of operation. It is to be understood that the decoder/latch 13 in the calculation and control circuit 9 is adapted to deliver a control signal, shown at 17, which is effective to close a shutter, not shown, at the termination of the integrating time interval determined by the computer 10.

It is a feature of the integrating time detector shown in FIG. 1 that the reference voltage which is supplied to one input of the voltage comparator 8 is changed under the control of the computer 10. The change in the reference voltage also depends on the film speed which is supplied from the bank of switches 11. The manner in which the computer 10 changes the reference voltage to permit an earlier determination of the integrating time interval for an increased length of integrating time interval will be described below with reference to FIG. 2.

Figure 2:
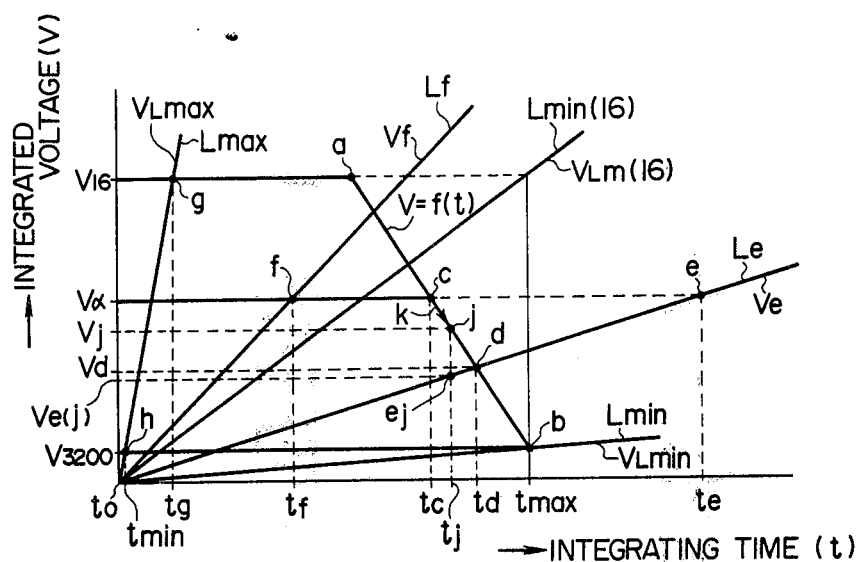
FIG. 2 graphically illustrates the choice of a reference voltage, illustrating the operation of the detector shown in FIG. 1.

In FIG. 2, the ordinate represents an integrated voltage V plotted against an integrating time t shown on the abscissa. It is to be understood that the illustration in FIG. 2 corresponds to the application of the integrating time detector of FIG. 1 to a photometric circuit of a photographic camera which is of direct photometry type. In the illustration of FIG. 2, a reference voltage $V_{16}$ represents a reference voltage corresponding to a film sensitivity of ASA 16 while a reference voltage $V_{3200}$ corresponds to a film sensitivity of ASA 3200. The reference voltage V has an increased magnitude for a low film sensitivity and has a low magnitude for a high film sensitivity. In FIG. 2, the photometry is permitted for a range of film sensitivities from ASA 16 to 3200. A minimum integrating time interval $t_{min}$ and a maximum integrating time interval $t_{max}$ are indicated on the abscissa, and indicate the minimum and the maximum integrating time interval, respectively, which can be permitted during the direct photometry. In a conventional photometric circuit, a perfect photometry is only permitted during an exposure period which corresponds to an integrating time interval from $t_{min}$ to $t_{max}$. For an integrating time interval greater than $t_{max}$, the leakage current of the integrating capacitor has an adverse influence upon the integrating action, preventing a proper exposure period from being determined. In addition, the determination can only be made after the termination of such integrating time interval of an increased length.

In FIG. 2, the origin is defined by an integrating time interval $t_0$ and an integrated voltage of zero. A number of rectilinear lines indicative of integrated voltages $V_{Lmax}$, $V_f$, $V_{Lm(16)}$, $V_e$ and $V_{Lmin}$ are shown extending from the origin and corresponding to a different value of illuminance L as a parameter. Of different the values of the illuminance $L_{max}$, $L_f$, $L_{min(16)}$, $L_e$ and $L_{min}$, $L_{max}$ represents the maximum illuminance and $L_{min}$ the minimum illuminance which can be determined photometrically. For purposes of illustration, it is assumed that the illuminance has a level $L_f$ and the ASA film sensitivity is $\alpha$. In this instance, the reference voltage V will have a value $V_\alpha$ shown on the ordinate. A proper exposure period is determined by photometry as the curve $V_f$ representing the integrated voltage for the illuminance $L_f$ crosses the reference voltage $V_\alpha$ or at a point of intersection f of the integrated voltage $V_f$ with a horizontal line extending from the value $V_\alpha$ on the ordinate. It will be seen that since the integrating time interval $t_f$ in this instance is located intermediate the minimum and the maximum value $t_{min}$ and $t_{max}$, it can be calculated by the usual direct photometry technique, and hence it is unnecessary to change the reference voltage $V_\alpha$.

However, considering the illuminance of $L_e$ and the reference voltage of $V_\alpha$, it will be noted that the rectilinear line representing the integrating voltage $V_e$ for the illuminance $L_e$ cannot cross the horizontal line corresponding to the reference voltage $V_\alpha$ before the maximum integrating time interval $t_{max}$ is reached. In other words, the line representing the integrated voltage $V_e$ crosses the horizontal line corresponding to the reference voltage $V_\alpha$ at a point e which goes beyond the maximum time interval $t_{max}$. The integrating time interval corresponding to the point of intersection e is $t_e$. Hence, it requires a longer period of time than the maximum time interval $t_{max}$ to determine the integrating time interval $t_e$ by the usual direct photometry technique. In such instance, the integrating action is influenced by the leakage current of integrating capacitor to prevent a proper exposure period from being determined, as mentioned previously. In accordance with the invention, a rectilinear line $\overline{ab}$ as shown in FIG. 2 is defined. Specifically, the line $\overline{ab}$ joins a point a on the horizontal line corresponding to the reference voltage $V_{16}$ with a point b on another horizontal line corresponding to the reference voltage $V_{3200}$. By utilizing the rectilinear line $\overline{ab}$, the integrating time interval is determined prematurely to eliminate the influence of the leakage current of the integrating capacitor. Any reference voltage corresponding to a point on the line segment $\overline{ab}$ is stored in the computer 10 and is supplied to the voltage comparator 8.

Continuing the description of the example for the illuminance $L_e$ and the reference voltage $V_\alpha$, a value corresponding to the ASA film speed $\alpha$ is established in the bank of switches 11 in the integrating time detector of FIG. 1, and such value is supplied to the computer 10 through the interface circuit 12. The computer 10 determines the reference voltage $V_\alpha$ corresponding to the ASA speed by utilizing a value stored in an internal memory which is manipulated under a program control, and supplies it on the data bus 10B to the decoder/latch 13 under the control of the address bus 10A. In response thereto, D-A converter 14 converts it into a corresponding analog reference voltage, which is then applied to one input of the comparator 8. As the photometry is initiated, the integrated voltage $V_e$ supplied to the other input of the voltage comparator 8 from the integrating circuit 2 is compared against the reference voltage $V_\alpha$. As mentioned previously, the integrated voltage $V_e$ cannot cross the horizontal line corresponding to the reference voltage $V_{60}$ before the maximum integrating time interval $t_{max}$ is reached. However, when an integrating time of $t_c$ is reached after the initiation of the photometry, the horizontal line corresponding to the reference voltage $V_\alpha$ crosses the line segment $\overline{ab}$ at a point of intersection c. In addition to storing the reference voltage response corresponding to the line segment $\overline{ab}$, the computer 10 stores the value of the reference voltage $V_\alpha$ which is being utilized for the photometry as well as the value of any corresponding film speed, so that at the integrating time $t_c$, it readily detects integrating time $t_c$ under a program control, and changes a subsequent reference voltage into a modified value which varies in accordance with the response to the line segment $\overline{ab}$. Accordingly, the reference voltage which varies along the line segment $\overline{ab}$ is fed to the voltage comparator 8 through the decoder/latch 13 and the D-A converter 14. The reference voltage gradually changes along the line segment $\overline{ab}$ in a direction indicated by an arrow k. At time $t_j$, the integrated voltage $V_e$ assumes a value $V_{e(j)}$ corresponding to a point ej on the line representing the integrated voltage $V_e$, while the reference voltage supplied to the voltage comparator 8 under the control of the computer 10 assumes a value $V_j$ corresponding to a point j on the line segment $\overline{ab}$. Hence, the output from the voltage comparator 8 does not change at this time. However, as the time passes and the integrating time of $t_d$ is reached, the integrated voltage crosses a reference voltage $V_d$ at a point of intersection d, whereby the voltage comparator 8 produces an output. The output is fed to the computer 10, and the corresponding integrating time interval $t_d$ is stored in the computer 10.

When the integrating time interval $t_d$ representing the intersection of the integrated voltage with the modified reference voltage is detected, the computer 10 calculates a true integrating time interval $t_e$ for the illuminance $L_e$ and the initial reference voltage $V_a$, utilizing the time interval $t_d$, the corresponding reference voltage $V_d$, the initial reference voltage $V_a$ and the rectilinear line representing the integrated voltage $V_e$ for the illuminance $L_e$ as follows:

$$t_e = \frac{V_a}{V_d} t_d \quad (1)$$

Representing the reference voltage corresponding to the line segment $\overline{ab}$ by $V=f(t)$, the reference voltage $V_d$ can be uniquely obtained as $V_d=f(t_d)$. Hence the equation (1) can be rewritten as follows:

$$t_e = \frac{V_a}{f(t_d)} t_d \quad (2)$$

From the above discussion, it will be appreciated that the true integrating time interval $t_e$ can be easily calculated at an earlier time $t_d$ which is less than the maximum integrating time interval $t_{max}$ even though the integrating time interval $t_e$ exceeds the maximum time interval $t_{max}$. In this manner, the adverse influence of the leakage current of the integrating capacitor can be avoided.

Considering the rectilinear line representing the integrated voltage $V_{Lmax}$ for the maximum illuminance $L_{max}$ which can be determined photometrically, it is seen that it crosses the reference voltage $V_{16}$ corresponding to the ASA speed 16 at a point of intersection g to indicate an integrating time interval of $t_g$, and also crosses the reference voltage $V_{3200}$ corresponding to the ASA film speed 3200 at a point of intersection h to indicate a minimum integrating time interval $t_{min}$. Considering the rectilinear line representing the integrated voltage $V_{Lmin}$ for the minimum illuminance $L_{min}$, it crosses the reference voltage $V_{3200}$ corresponding to the ASA film speed 3200 at a maximum integrating time interval $t_{max}$. The rectilinear line representing the integrated voltage $V_{Lm(16)}$ for the illuminance $L_{min(16)}$ crosses the reference voltage $V_{16}$ corresponding to the ASA film speed 16 at the maximum integrating time interval $t_{max}$.

Figure 3:
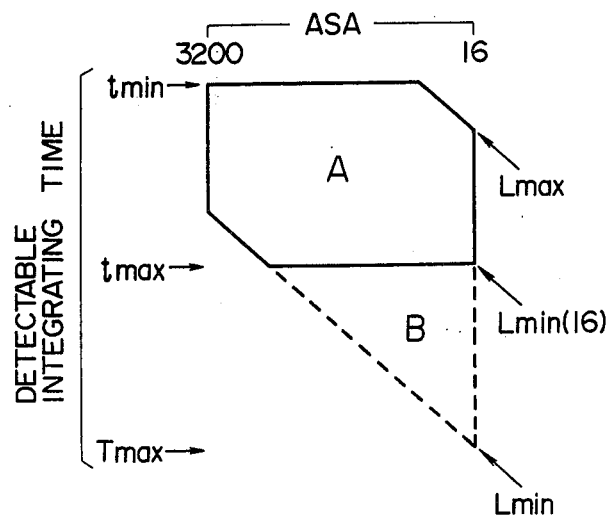
FIG. 3 is a diagrammatic view of the integrating time interval which can be detected by the detector of FIG. 1 as a function of the film speed and the illuminance.

FIG. 3 diagrammatically illustrates the operable range of the integrating time detector described above in connection with FIGS. 1 and 2, as a function of the ASA film speed and the illuminance. The abscissa represents the ASA film speed from 16 to 3200 while the ordinate indicates the integrating time interval which can be detected. On the ordinate, the minimum integrating time interval $t_{min}$ is shown topmost, and the maximum time interval $t_{max}$ which can be detected by the direct photometry technique is indicated below that. The maximum integrating time interval $T_{max}$ which can be detected by the integrating time detector of the invention is shown at the bottom of the diagram. Different levels of illuminance $L_{max}$, $L_{min(16)}$, $L_{min}$ are shown by arrows which are directed obliquely upward to the left, and it is to be understood that the same value of illuminance prevails along the direction which is indicated by the respective arrow. It will be seen that a region A shown in FIG. 3 represents the range where the photometry of a conventional integrating circuit of direct photometry type is operable while a region B represents a range which can be detected by the integrating time detector of the invention. Thus, the region A extends between the minimum and the maximum integrating time interval $t_{min}$ and $t_{max}$ for ASA film sensitivity from 16 to 3200 for illuminances from $L_{max}$ to $L_{min}$. By contrast, the maximum integrating time interval which can be detected is extended to a value $T_{max}$ when the integrating time detector of the invention is used.

Figures 4, 5:
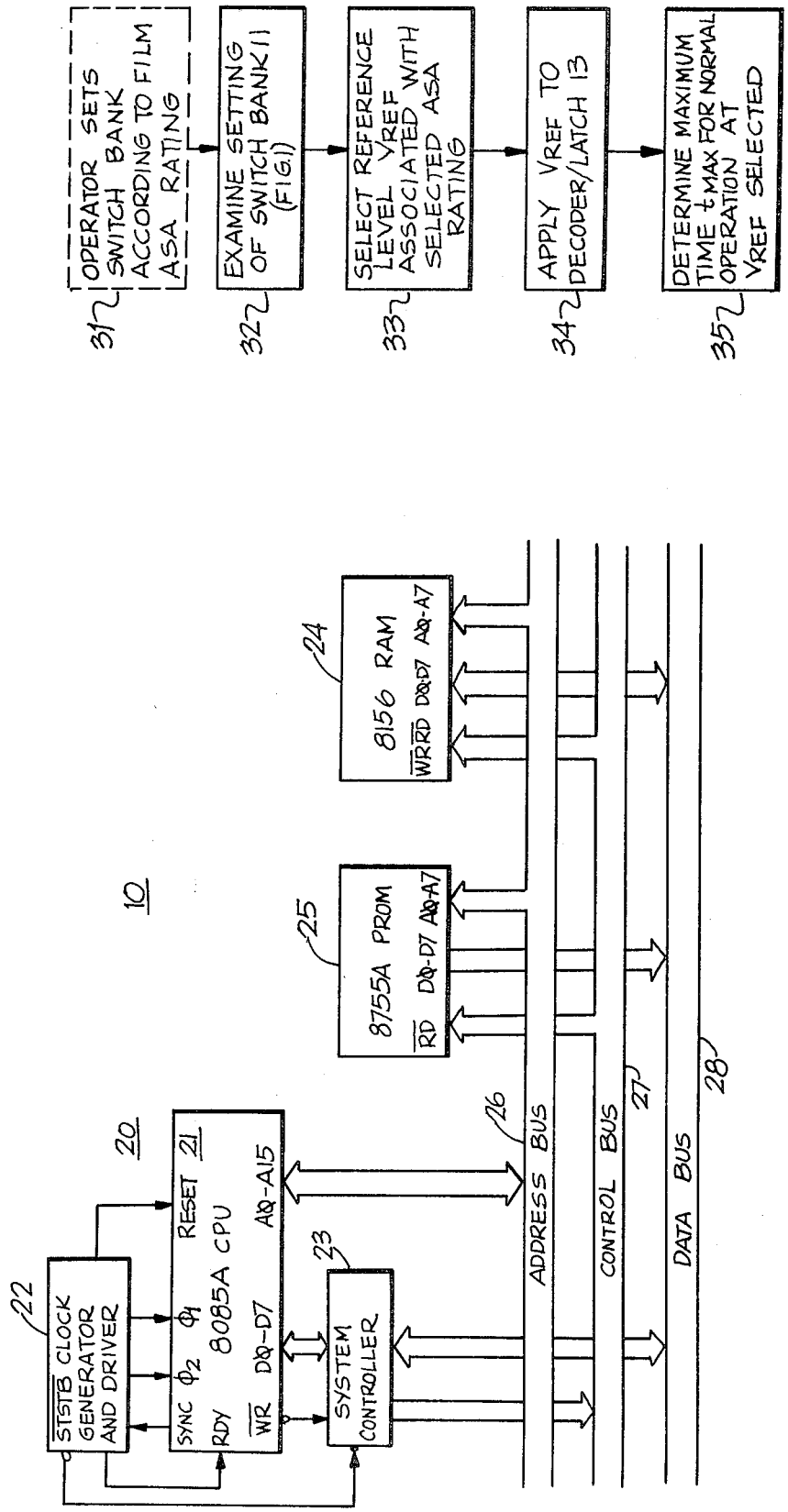
FIG. 4 is a block diagram showing the computer of FIG. 1 in greater detail.
FIGS. 5 and 6 are flow diagrams useful for describing the operations performed by the computer of FIG. 1.

The computer 10 of FIG. 1 is shown in greater detail in FIG. 4 and comprises a central processor unit 20 comprising: a microprocessor 21, clock generator 22, and system controller 23 including bi-directional bus drivers and a system control; a random access memory (RAM) 24 and a programmable read-only memory (PROM) 25. RAM 24 and PROM 25 are coupled to CPU 21 by data bus 26. Data stored in PROM 25 and RAM 24 is accessed by addressing the desired memory locations through address bus 26 and enabling the data transfer to CPU 21 by control bus 27. Data is read into RAM 24 in a similar fashion. The CPU is preferably a Model 8085A; the RAM is preferably a Model 8156 with I/O, counter and timer; and the PROM is preferably a Model 8755A with I/O, all manufactured by Intel.

Figure 6:
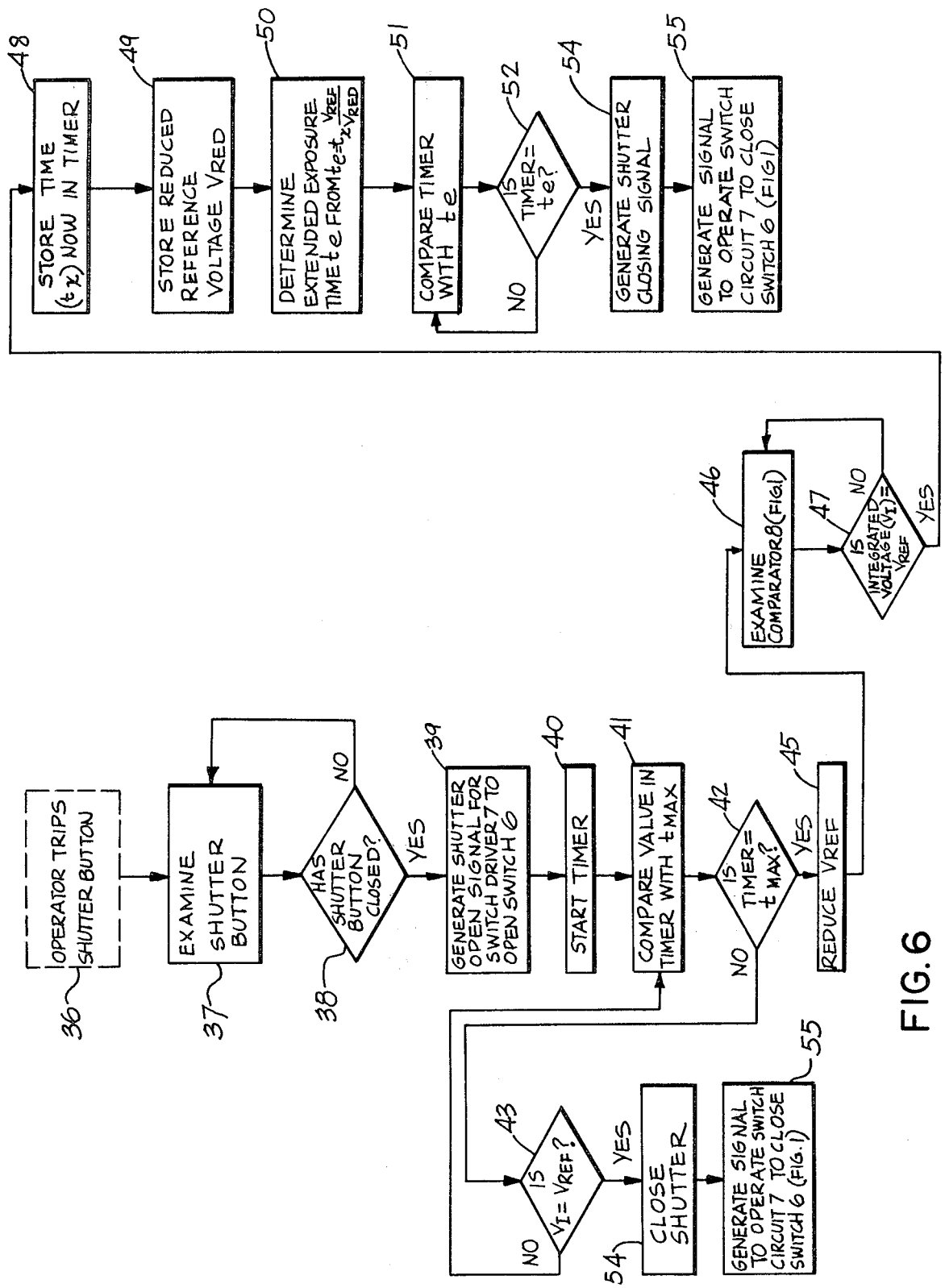

The operations performed by computer 10 are shown by the flow diagrams of FIGS. 5 and 6 wherein the initial conditions preparatory to a photographing operation are established in the manner shown in FIG. 5. The film rating is selected by setting the switch bank (31). Computer 10 examines the setting (32) and selects the reference voltage level $V_{REF}$ associated with the ASA rating of the film (33). The reference voltage is applied to decoder/latch 13 (33). D/A converter 14 converts the digital value to an analog level to enable comparator 8 to compare $V_{REF}$ to the integral voltage developed by operational amplifier 3.

The computer 10 then determines the maximum time $t_{max}$ during which a perfect photometry may be performed, in accordance with curve $\overline{ab}$ (35).

The electronic control of the photographing operation is in accordance with the flow diagram of FIG. 6 wherein the operation is initiated by operation of a shutter button (36) which trips the camera shutter (not shown for purposes of simplicity). The computer 10 detects the closure of the shutter button (37, 38) to: develop a signal (39) for operating switch driver 7 to open switch 6; and to start a timer (40) which is typically a register in CPU 20 which is periodically incremented, as is conventional. The value in the timer is periodically compared with the value $t_{max}$ previously calculated (41). If the integrated signal reaches the value $V_{REF}$ before the timer reaches $t_{max}$, a normal photometry is performed by closing the shutter (42, 43, 54). A signal is developed to operate switch driver circuit 7 to close switch 6 preparatory to the next photographing operation (55).

If the timer value reaches $t_{max}$ (42) and $V_I$ has not yet reached $V_{REF}$ then $V_{REF}$ is reduced (45) in accordance with the slope of curve ab. The comparator 8 is periodically examined (46). When $V_I=V_{REF}$ (reduced), i.e. $V_{RED}$ (47) the time ($t_x$) in the timer is stored (48) and the reduced $V_{REF}$ value is stored (49). These values are utilized, together with the original $V_{REF}$, to calculate the extended time $t_e$ (50) in accordance with the equation $t_e = t_x V_{REF}/V_{RED}$. Thus, the extended time $t_e$ is determined before its actual occurrence, avoiding the need for relying on the limited capability of the integrating element 4.

The timer is periodically compared with the value $t_e$ (51). When the timer value equals $t_e$ (52), the shutter closing signal is generated (54) and the signal for closing switch 6 is generated (55).

Thus a proper photometry is obtained regardless of the limitations of the integrating element 4 and before the actual extended time occurs.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. An integrating time detector for a photographic apparatus, comprising:
    integrating means for integrating an input signal to provide an integral signal;
    means for producing a given reference signal for comparison with the integral signal until a given time interval is reached, and for producing a changing reference signal which changes as a given function of time after the given time interval if the integral signal does not reach the given reference value within the given time interval, thereby detecting a time when the integral signal coincides with the changing reference voltage, said means calculating an integrating time interval corresponding to the given reference signal based on the time when the coincidence is detected, the given reference signal and the given function of time; and
    comparison means for comparing the integral signal outputted from the integrating means against the reference signal produced by the calculating means to output a coincidence signal whenever the integrating and reference signals coincide with each other.

2. An integrating time detector according to claim 1, further including means for presetting information which corresponds to the given reference signal against which the integral signal from the integrating means is compared, the calculating means producing the given reference signal which corresponds to the preset information for a given time interval which corresponds to the given reference signal.

3. An integrating time detector according to claim 1, further including a display connected to the calculating means for displaying an integrating time interval derived by the calculating means.

4. An integrating time detector according to claim 1 in which the calculating means comprises a computer.

5. An integrating time detector according to claim 4 in which the calculating means additionally comprises a decoder/latch for latching and decoding various information supplied from the computer, and a digital-analog converter for converting digital information from the decoder/latch which corresponds to the reference signal and for converting the digital information into a corresponding analog reference signal for supply to the comparison means.

6. An integrating time detector according to claim 1, further including an interface circuit which converts information preset by the information preset means into a signal compatible with the calculating means.

7. An integrating time detector according to claim 1 in which the integrating means comprises an integrating, operational amplifier having its one input supplied with an input signal corresponding to an electrical conversion of light from an object being photographed which is photometrically determined, an integrating capacitor connected across said one input of the operational amplifier and the output terminal thereof, and a series circuit including a resistor and a switch connected in shunt with the integrating capacitor, and in which the comparison means comprises a comparison, operational amplifier having its one input connected to the output of the first mentioned operational amplifier and having its other input connected to receive the reference signal from the calculating means, an output signal from the comparison, operational amplifier being applied to the calculating means.

8. A time detector for detecting the time interval for a photographing operation comprising:
    first means for generating a signal which is a function of light received by said first means, responsive to a shutter opening;
    integrating means for integrating said signal;
    second means for providing an initial reference level;
    said second means including third means for altering said reference level after a first predetermined time interval;
    comparator means for comparing said integrated signal against said reference level to generate an output;
    said second means including fourth means for determining the time for closing the shutter to provide a proper photographing operation responsive to the time said comparator means generates an output and responsive to the initial reference level.

9. A method for determining the time for a proper photographing interval to operate a shutter comprising the steps of:
    providing a first reference level representative of the film speed of the film used for photographing;
    generating a signal representative of the light being reflected from the image being photographed, responsive to the opening of the shutter;
    integrating said signal;
    determining a first predetermined time in accordance with said first reference level;
    altering said first reference level at a predetermined rate upon the occurrence of said first predetermined time; p1 determining a first time interval when the integrated signal equals the altered reference level;
    determining the time needed for a proper photographing operation based on the first time interval, the first reference level and the reduced reference level; and
    closing the shutter responsive to the calculated elapsed time.

10. A method for operating a shutter to provide a proper photographing operation comprising the steps of:
    providing a reference level responsive to the film speed of the film being used for the photographing operation;
    generating a signal representing the light reflected from the image being photographed responsive to the opening of the shutter;

integrating said signal;

altering the reference level at a predetermined time prior to the prior time interval required;

calculating the required time interval for closing the shutter at a time prior to the required time responsive to the time required for said integrated signal to equal said reduced value;

closing said shutter when said calculated time has elapsed.

11. A method for determining an extended exposure interval for operating a shutter including a timer and photometry means, comprising the steps of:

starting the timer responsive to opening of the shutter, said photometry means also being activated responsive to the shutter opening to develop a signal level representative of light reflected from the object being photographed;

determining a reference level and maximum time interval for an unextended photographing operation determined by the film ASA rating;

reducing said reference level when said maximum time interval is reached;

comparing the output level of said photometry means against said reference level;

determining the extended time interval for the photographing operation when said levels compare, based upon the original reference level, the reduced reference level and the time when said levels compare.

12. Determining a time interval for a photographing operation through the employment of a photometry circuit which generates an integrated signal responsive to the light level sensed by the photometry circuit including the steps of:

determining an initial threshold level in accordance with the characteristics of the film being used in the photographing operation;

successively reducing the threshold level a predetermined time after the initiation of a photographing operation;

terminating the photographing operation responsive to the integrated signal reaching the threshold level prior to the predetermined time; and determining the extended time required for the integrated signal to reach the initial threshold level responsive to the integrated signal reaching the reduced threshold level.

13. The method of claim 12 further comprising the step of generating a terminating signal for terminating the photographing operation at the extended time calculated.

14. The method of claim 12 wherein the step of determining the extended time further comprises the step of noting the time when the integrated signal reaches the reduced threshold level and determining the extended time ($t_{ex}$) in accordance with the relationship $t_{ex} = V_f V_i/t_i$ where $V_f$ is the signal level representing the characteristic of the film, $V_r$ is the instantaneous value of the reducing signal and $t_r$ is the time at which the integrated signal reaches the value of the reducing signal $V_r$.

* * * * *

UNITED STATES PATENT AND TRADEMARK OFFICE
CERTIFICATE OF CORRECTION

PATENT NO. : 4,329,030
DATED : May 11, 1982
INVENTOR(S) : Mamoru Aihara, et al.

It is certified that error appears in the above—identified patent and that said Letters Patent is hereby corrected as shown below:

column 3, line 42, "Of different the values" should read --Of the different values--.

Column 4, line 40, "voltage $V_{60}$" should read --voltage $V_a$--.

Column 4, line 64, "ab" should read --$\overline{ab}$--.

Column 8, lines 50-51 "predetermined time p1" should read --predetermined time.--

Signed and Sealed this

Eighth Day of February 1983

[SEAL]

Attest:

GERALD J. MOSSINGHOFF

Attesting Officer

Commissioner of Patents and Trademarks

UNITED STATES PATENT AND TRADEMARK OFFICE
CERTIFICATE OF CORRECTION

PATENT NO. : 4,329,030
DATED : May 11, 1982
INVENTOR(S) : Mamoru Aihara, et al.

It is certified that error appears in the above—identified patent and that said Letters Patent is hereby corrected as shown below:

Column 3, line 42, "Of different the values" should read --Of the different values--.

Column 4, line 40, "voltage $V_{60}$" should read --voltage $V_a$--.

Column 4, line 64, "ab" should read --$\overline{ab}$--.

Column 8, lines 50-51, "predetermined time pl" should read --predetermined time;--

This certificate supersedes Certificate of Correction issued February 8, 1983.

Signed and Sealed this

Fourteenth Day of June 1983

[SEAL]

Attest:

DONALD J. QUIGG

Attesting Officer

Acting Commissioner of Patents and Trademarks